(12) United States Patent
Bourgeois

(10) Patent No.: US 7,237,547 B1
(45) Date of Patent: Jul. 3, 2007

(54) OUTDOOR COOKING APPARATUS

(76) Inventor: Norman R. Bourgeois, 712 St. George Ave., Jefferson, LA (US) 70121

( * ) Notice: Subject to any disclaimer, the term of this patent is extended or adjusted under 35 U.S.C. 154(b) by 56 days.

(21) Appl. No.: 10/870,334

(22) Filed: Jun. 17, 2004

Related U.S. Application Data

(60) Provisional application No. 60/479,255, filed on Jun. 17, 2003.

(51) Int. Cl.
*F24C 3/14* (2006.01)
*A47J 37/07* (2006.01)

(52) U.S. Cl. .......................... 126/9 R; 126/40; 126/50; 126/38

(58) Field of Classification Search ................ 126/9 R, 126/25 R, 40, 50, 39 B, 38, 9 B; 99/340
See application file for complete search history.

(56) References Cited

U.S. PATENT DOCUMENTS

| | | | |
|---|---|---|---|
| 3,053,169 A | | 9/1962 | Rappaport |
| 4,587,947 A | * | 5/1986 | Tomita ........................ 126/9 R |
| 4,735,135 A | | 4/1988 | Walker |
| 5,065,735 A | * | 11/1991 | Bourgeois et al. ............. 126/40 |
| 5,106,642 A | | 4/1992 | Ciofalo |
| 5,301,602 A | | 4/1994 | Ryezek |
| 5,307,789 A | * | 5/1994 | Newby ........................ 126/9 R |
| 5,359,988 A | * | 11/1994 | Hait ........................... 126/25 R |
| 5,442,999 A | | 8/1995 | Meister |
| 5,513,623 A | * | 5/1996 | Hong ........................... 126/38 |
| 5,531,154 A | | 7/1996 | Perez, III |
| 5,758,569 A | | 6/1998 | Barbour |
| 5,813,321 A | | 9/1998 | Bourgeois |
| 5,832,915 A | * | 11/1998 | Skidmore et al. ............ 126/9 R |
| 5,896,810 A | | 4/1999 | Barbour |
| 5,970,852 A | | 10/1999 | Bourgeois |
| 5,979,428 A | * | 11/1999 | Greene, Jr. ................... 126/38 |
| 6,058,830 A | | 5/2000 | Bourgeois |
| 2005/0217657 A1 | * | 10/2005 | Anue ........................... 126/9 R |

FOREIGN PATENT DOCUMENTS

| | | |
|---|---|---|
| AT | 2685862 | 7/1993 |
| DE | 217592 | 10/1961 |
| GB | 2205734 A | 12/1988 |
| WO | WO 01/52706 A1 * | 7/2001 |

* cited by examiner

*Primary Examiner*—Josiah C. Cocks
(74) *Attorney, Agent, or Firm*—Garvey, Smith, Nehrbass & North, L.L.C.; Charles C. Garvey, Jr.

(57) ABSTRACT

An outdoor cooking apparatus includes a burner frame that has a base with a portion that engages an underlying support surface during use, an upper grill or grate that receives a pot during use, the upper grill having a cooking surface. The frame includes a plurality of legs that extend between the base and the grill. In the preferred embodiment, the base can be a ring. In the preferred embodiment, the grill can include a ring and a plurality of radially extending struts. In this fashion, the ring surrounds a pot that is placed upon the struts, limiting the lateral movement of the pot. The pot has a diameter and a height, the pot is sized and shaped to fit inside the frame envelope during shipment or storage. The legs extend around the pot and the burner element in the storage position. A wind guard shroud is attached to the underside of the radial struts. This shroud is also contained within the pot when in a storage position.

31 Claims, 5 Drawing Sheets

OUTDOOR COOKING APPARATUS

CROSS-REFERENCE TO RELATED APPLICATIONS

Priority of U.S. Provisional Patent Application Ser. No. 60/479,255, filed Jun. 17, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an outdoor cooking apparatus of improved configuration that includes a burner that can be powered with pressurized gas such as butane or propane, one or more pots and/or pot liners that store within the envelope of the burner frame. More particularly, the present invention relates to an outdoor cooking device with a frame that provides a nozzle, a shroud or wind guard that surrounds the burner nozzle, and wherein preferably one or two pots can be nested and stored within the envelope of the burner frame, either of the pots being supported during cooking upon a grate portion of the burner frame.

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters.

Examples of these prior art type outdoor cooking devices can be seen in the brochures of Metal Fusion, Inc., of Jefferson, La. Patents have issued naming Norman Bourgeois as inventor that relate to burners and related cooking apparatus. Examples include U.S. Pat. No. 5,065,735 for a "Convertible Burner Apparatus" that features different primary burner frames and legs that can elevate the burner frames. Other Bourgeois patents that relate to cooking devices include the aforementioned U.S. Pat. Nos. 5,813,321; 5,970,852; and 6,058,830.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 90PK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are appertured longitudinally for receiving a knife to cut food within the tube member.

Issued patents to Barbour (U.S. Pat. Nos. 5,758,569 and 5,896,810) disclose a cooking apparatus directed to the frying of poultry items such as turkeys.

One of the problems with outdoor cookers is the handling of very large pots that contain a high volume of cooking fluid such as vegetable oil. It is desirable that such an outdoor cooking apparatus have good stability to support the very heavy and often tall pot during cooking, and during placement of or removal of the pot, liner or both from the burner. Further, the cooking fluid is desirably reused for certain cooking fluids such as vegetable oils. One solution is to drain the pot, yet also provide for drainage without removal from the burner. However, the burner must enable such drainage and still provide a safe, stable cooking platform for very large capacity cooking pots.

BRIEF SUMMARY OF THE INVENTION

The present invention provides an improved outdoor cooking apparatus that includes a burner frame having legs and a base with a foot (or feet) portion that engages an underlying support surface, floor or the like. An upper grate or grill receives a pot during use, the upper grill or grate having a cooking surface that receives heat from a fired burner nozzle supported by the frame.

The frame includes a plurality of legs that extend between the base and the grill.

The burner nozzle element is supported by the frame at a position under the grate or grill. In the preferred embodiment, a wind guard shroud extends (e.g. 360) degrees around the burner nozzle.

One or two pots is provided, each having a diameter and a height. The pots can include taller and shorter pots, the taller pot being sized and shaped to fit inside the envelope of the frame. A food holding basket, food holding insert, or pot liner can be placed inside one of the pots. The frame envelope can be defined as the area within the confines of the legs, base and the grill.

The legs of the burner apparatus extend around the pot in the storage or shipping position. The burner element can be positioned within the pot interior.

In the preferred embodiment, the wind guard or shroud also occupies a position inside the pot interior when the apparatus is in the storage position or shipping.

A second, shorter but larger diameter pot can be added to the apparatus in the stored position wherein the taller pot fits inside of the shorter pot, the shorter pot having a larger diameter. The combination of taller and smaller pots fit inside the envelope of the burner frame for storage or shipment. Yet another pot can fit inside the taller pot.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
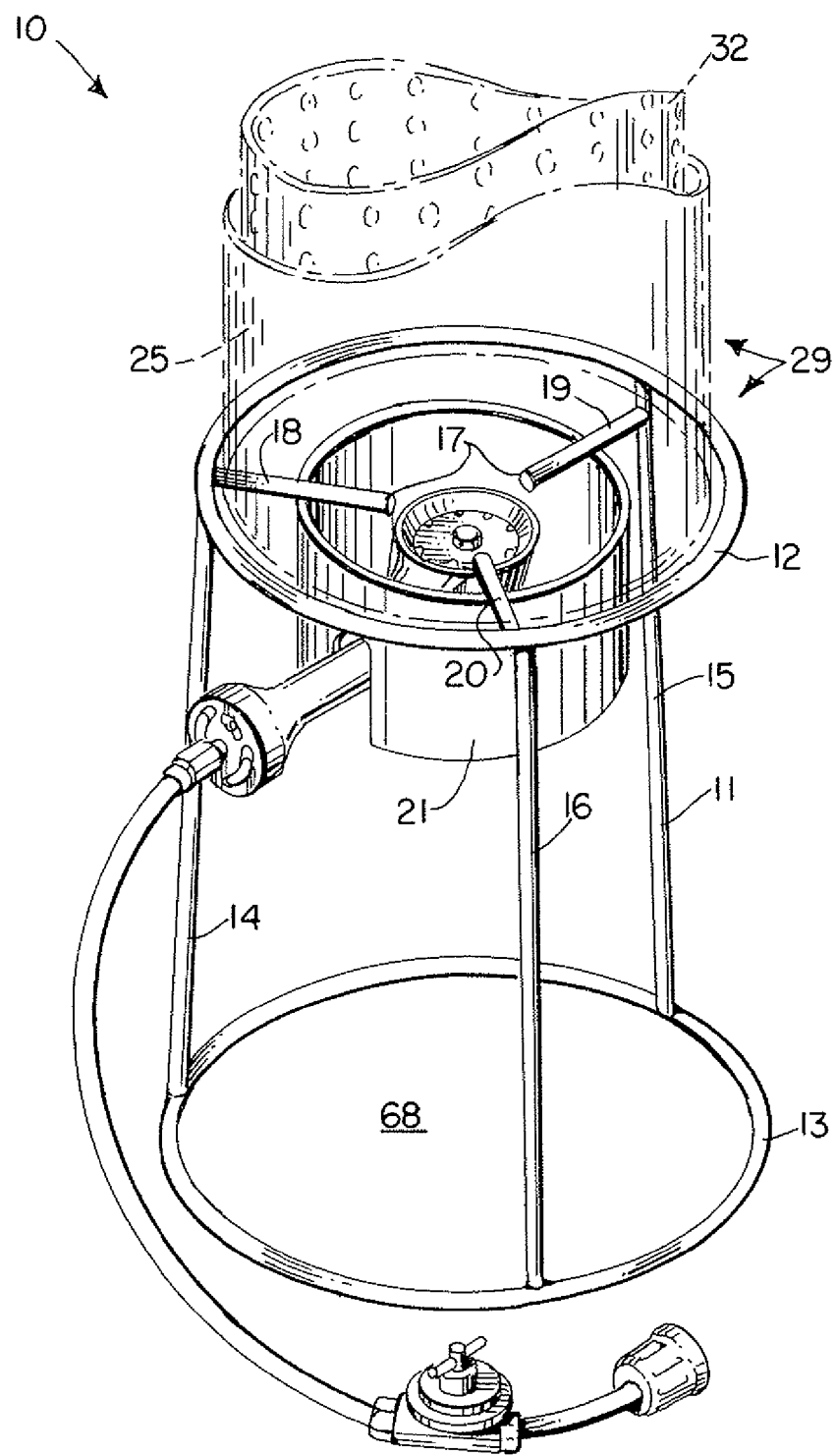
FIG. 1 is a partial perspective view of the preferred embodiment of the apparatus of the present invention illustrating the burner frame, shroud or wind guard, burner nozzle, fuel hose and regulator.

FIGS. 3, 4, 5 and 8 show the preferred embodiment of the apparatus of the present invention, designated generally by the numeral 10. In FIG. 1, a cooking position 29 is shown. In s 3-5, a storage or shipping position 28 is shown.

The apparatus 10 of the present invention provides a cooking apparatus 10 that includes a frame 11. The frame 11 can be constructed of multiple legs and one or more rings. Frame 11 has an upper ring 12, a lower ring 13, and a plurality of legs 14, 15, 16 that span between the upper 12 and lower 13 rings. Each leg 14, 15, 16 is connected (eg. welded) at one leg end portion to the upper ring 12 and at the other leg end portion to the lower ring 13. The lower ring 13 defines a foot or feet for legs 14, 15, 16 for resting upon a support surface 68 such as a floor, slab, or the like. Alternatively, lower ring 13 can be eliminated if legs 14, 15, 16 are structurally well connected to ring 12 and optionally cross braced.

Figures 5, 6, 7:
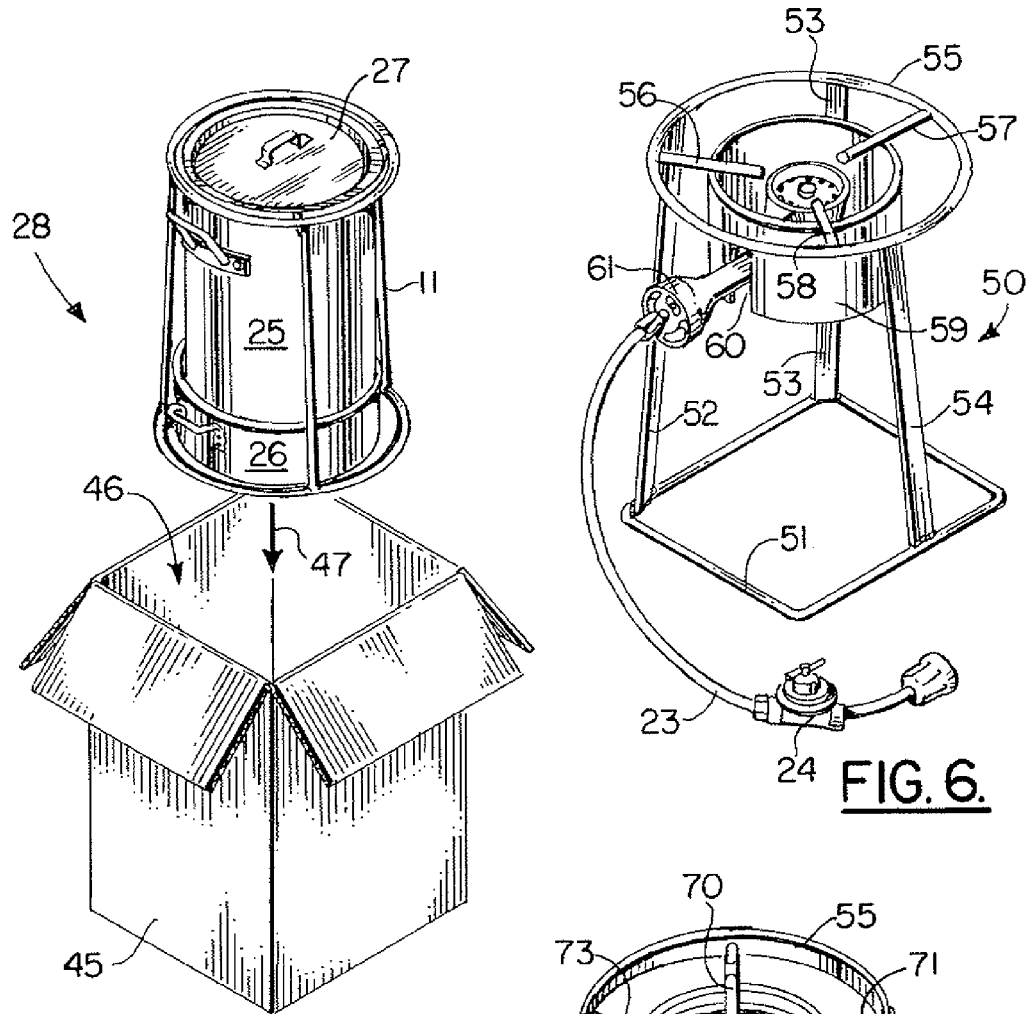
FIG. 5 is a perspective view of the preferred embodiment of the apparatus of the present invention showing the shipping or storage position.
FIG. 6 is a partial perspective view of the preferred embodiment of the apparatus of the present invention showing an alternate burner frame construction.
FIG. 7 is a partial perspective view of the preferred embodiment of the apparatus of the present invention showing another alternative burner construction.

A plurality of radially extending and circumferentially spaced struts 18, 19, 20 are provided, connected respectively to the top of each leg 14, 15, 16 and preferably just below the upper ring 12 (see FIG. 1). The plurality of struts 18, 19, 20 define an upper grill or grate 17 upon which a selected pot, such as tall pot 25 or short pot 26, can be placed when cooking (see FIG. 1). Pot 25 can have handles 40, 41. Pot 26 can have handles 42, 43. In the preferred embodiment, each of the pots 25, 26 has an external diameter that is smaller than the internal diameter of upper ring 12. In the preferred embodiment, the shorter pot 26 has an internal diameter that is larger than the external diameter of taller pot 25 so that the taller pot 25 can be placed inside of the shorter pot 26 as shown in FIGS. 2-5 when in storage or shipping position 28. The shorter pot 26 has an external diameter that is smaller than the internal diameter of lower ring 13 as shown in FIG. 5.

Figures 3, 4:
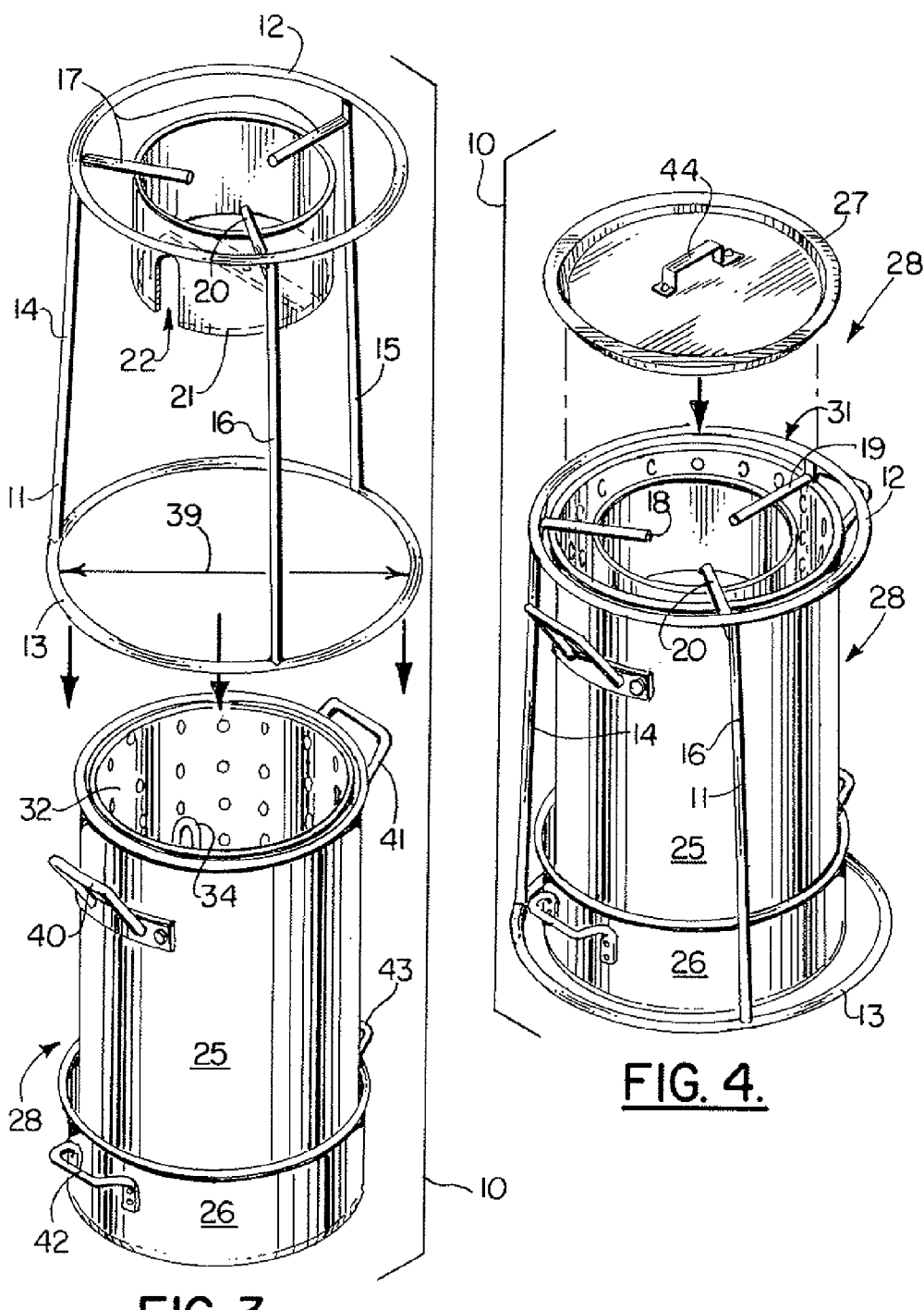
FIG. 3 is a perspective view of the preferred embodiment of the apparatus of the present invention illustrating the burner frame with burner nozzle removed, a pot and pot liner.
FIG. 4 is a perspective view of the preferred embodiment of the apparatus of the present invention.

The frame 11 supports wind guard or shroud 21. The wind guard or shroud 21 can be attached (for example, welded) to struts 18, 19, 20 as shown in FIGS. 1 and 3. The radial struts 18, 19, 20 are welded to corresponding legs 14, 15, 16 at a position that is preferably just below upper ring 12 (see FIGS. 1 and 8).

Figure 8:
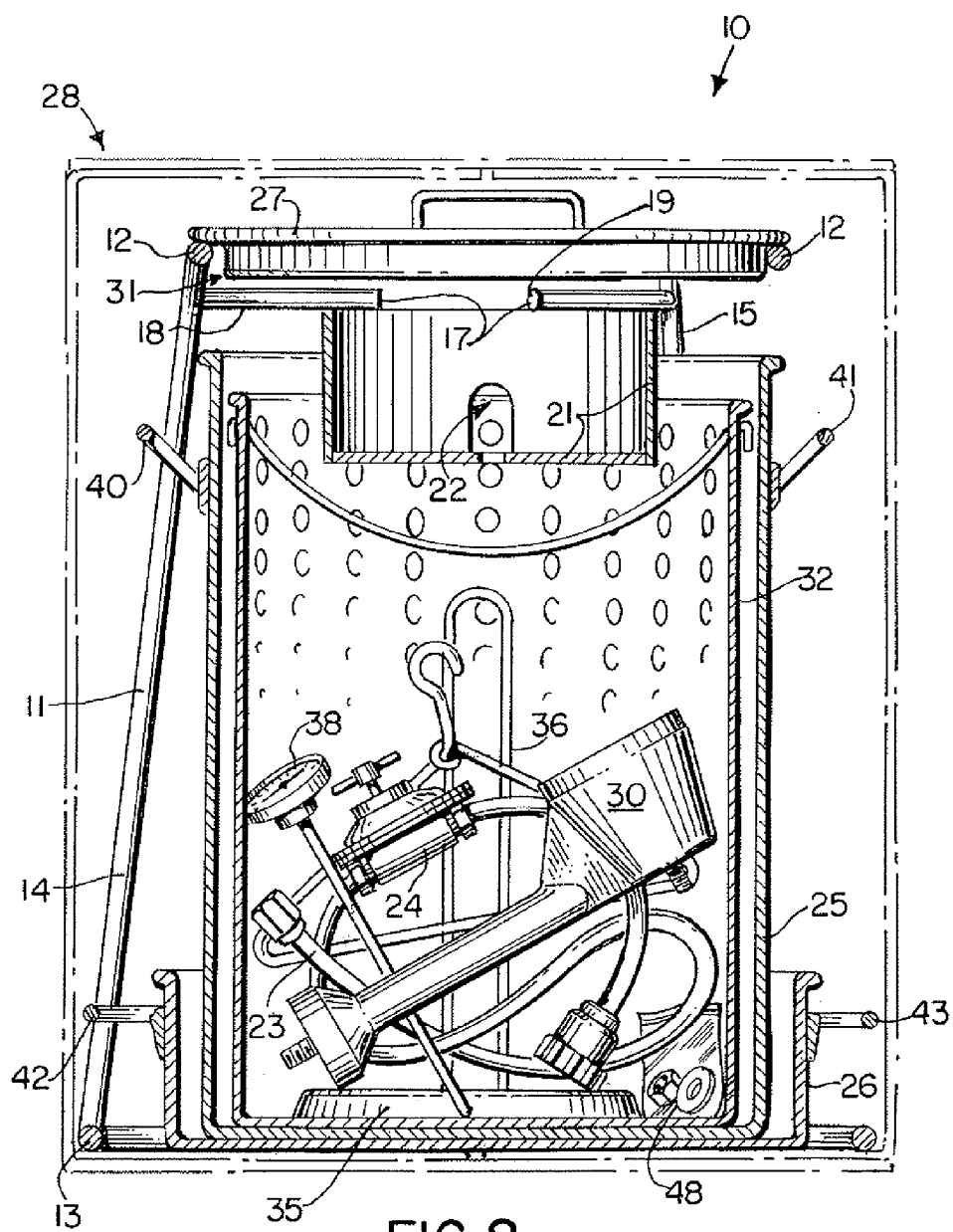
FIG. 8 is a sectional, elevation view of the preferred embodiment of the apparatus of the present invention.

When the lower ring 13 rests upon an underlying support surface 68, the tall pot 25 can be of a height that extends from the support surface 68 to just below the underside of radial struts 18 as shown in FIGS. 5 and 8. Lid 27 is preferably of a thickness or height that extends from a position that is between the upper surface of the radial struts 18 and near the upper surface of the upper ring 12 (see FIG. 8). In this fashion, the lid 27 can be placed upon the radial struts 18, 19, 20 occupying a recess 31 that is in between struts 18, 19, 20 and the top of upper ring 12. Recess 31 can have a height of, for example, about ½-1 inches.

The envelope of the frame 11 is defined by the upper ring 12, the lower ring 13 (having inner diameter 39), and the legs 14, 15, 16 in the storage or shipping position 28 of FIGS. 5 and 8. Pots 25, 26 preferably fit through the interior of ring 13, even if supplied with handles 40, 41, 42, 43. As seen if FIG. 8, this envelope can contain within its confines, the taller pot 25, the shorter pot 26, and the lid 27 as well as one or more food holding inserts and accessories. Such inserts and accessories can include basket 32 and bail 33, poultry holder 34 (e.g. including plate 35 and skewer 36), lifting device 37, thermometer 38 as well as knockdown parts such as burner element 30 and a package having bolted connection 4B (see arrows 49 in FIG. 2).

However, the lid 27 can have a handle 44 that extends to or a short distance above upper ring 12. The burner nozzle 30 can be removably attached to wind guard shroud 21 using a bolted connection 48, for example. During shipping, the burner nozzle 30 and its bolted connection 48 can be disconnected from wind guard shroud 21 and stored inside of taller pot 25 when in the storage position 28 of FIG. 5.

Figure 2:
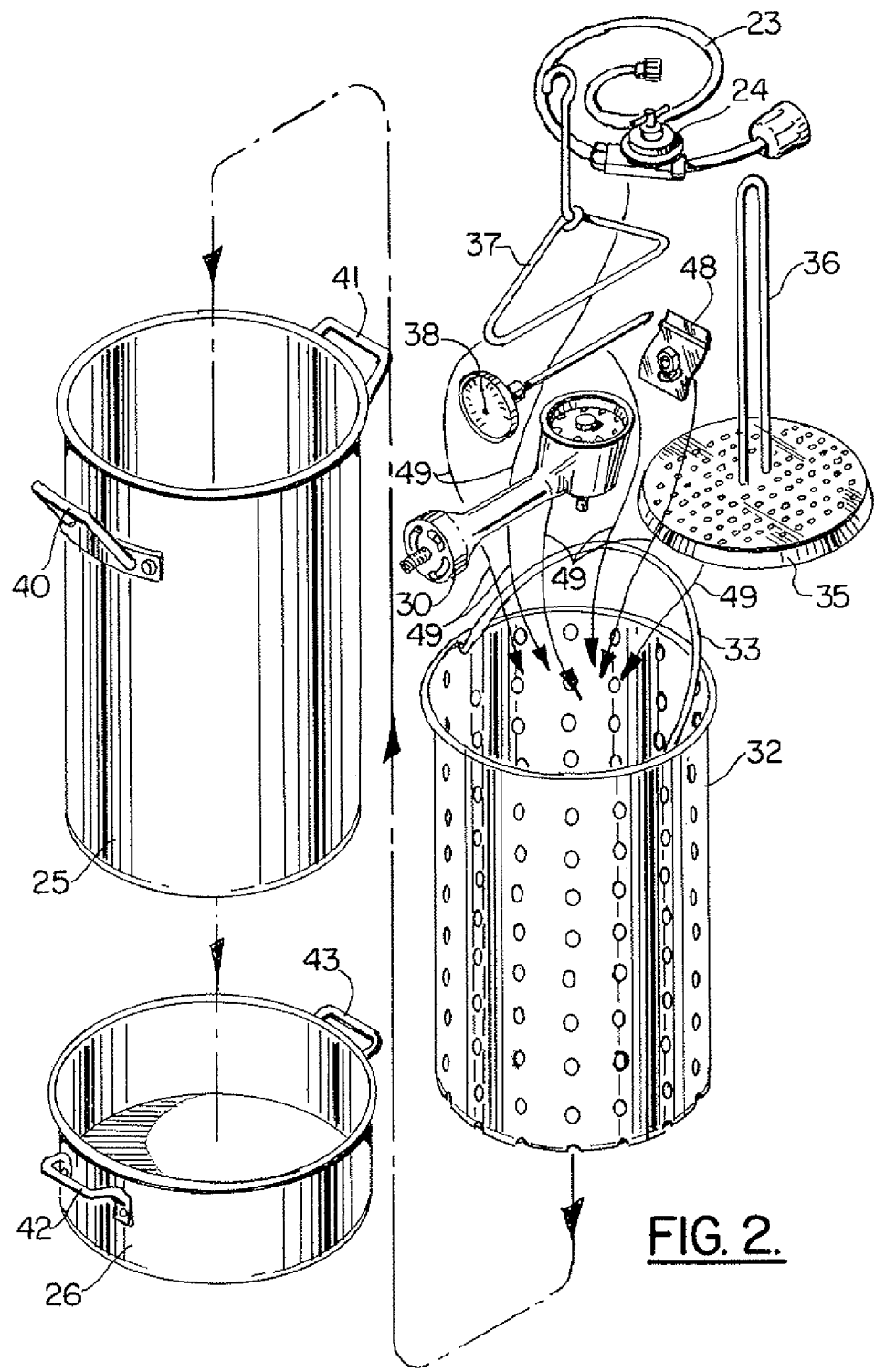
FIG. 2 is a perspective exploded view of the preferred embodiment of the apparatus of the present invention.

A slot 22 can be provided on wind guard shroud 21 for enabling attachment of burner nozzle 30 to frame 11 in the position shown in FIGS. 1 and 2. The burner nozzle 30 can be supplied with fuel via a flexible hose 23 and regulator 24, as is known in the art.

In FIG. 5, box 45 has interior 46. The nested combination of burner frame 11, tall pot 25, small pot 26, lid 27 and the various inserts and accessories shown in FIG. 8 all fit within interior 46 of box 45 as indicated by arrow 47.

In FIGS. 6 and 7, a burner apparatus 50 is shown having a slightly different configuration. The burner frame of FIGS. 6 and 7 will operate with the pots 25, 26, basket 32, poultry holder 34, lifting device 37, thermometer 38, hose 23 and regulator 24 as shown in FIGS. 1-5 and 8. The burners apparatus 50 simply illustrates that a different burner configuration can be provided.

In FIGS. 6 and 7, burner apparatus 50 has a square base 51, three legs 52, 53, 54, (FIG. 6) upper ring 55 which can be made of round cylindrically shaped bar stock or flat bar stock as shown in FIGS. 6 and 7 respectively. A plurality of struts 56, 57, 58 extend inwardly from ring 55, and preferably from the underside of ring 55.

Wind guard or shroud 59 is connected to struts 56, 57, 58, preferably being welded to the underside of struts 56, 57, 58. A slot 60 in wind guard or shroud 59 enables a burner element 61 to be attached thereto.

In FIG. 7, burner 50 has grate 62 can be comprised of four struts 69, 70, 71, 72, each having a curved portion 73. In FIG. 7, the burner frame provides a square base 51 and four legs 64, 65, 66, 67. The wind guard or shroud 59 has slot 60 for accommodating burner element 61. The wind guard or shroud 59 is preferably attached to the struts 69, 70, 71, 72 at a position that is spaced radially inwardly of the curved section 73. The curved section 73 also help center shroud 59 during welding.

The following is a list of suitable parts and materials for the various elements of the preferred embodiment of the present invention.

PARTS LIST

| Parts Number | Description |
| --- | --- |
| 10 | cooking apparatus |
| 11 | frame |
| 12 | upper ring |
| 13 | lower ring |
| 14 | leg |
| 15 | leg |
| 16 | leg |
| 17 | grate |
| 18 | radial strut |

-continued

| Parts Number | Description |
| --- | --- |
| 19 | radial strut |
| 20 | radial strut |
| 21 | wind guard shroud |
| 22 | slot for burner nozzle |
| 23 | fuel hose |
| 24 | regulator |
| 25 | tall pot |
| 26 | short pot |
| 27 | lid |
| 28 | storage position |
| 29 | cooking position |
| 30 | burner nozzle |
| 31 | recess |
| 32 | basket |
| 33 | bail |
| 34 | poultry holder |
| 35 | plate |
| 36 | skewer |
| 37 | lifting device |
| 38 | thermometer |
| 39 | ring internal diameter |
| 40 | pot handle |
| 41 | pot handle |
| 42 | pot handle |
| 43 | pot handle |
| 44 | lid handle |
| 45 | box |
| 46 | box interior |
| 47 | arrow |
| 48 | bolted connection |
| 49 | arrow |
| 50 | burner apparatus |
| 51 | square base |
| 52 | leg |
| 53 | leg |
| 54 | leg |
| 55 | upper ring |
| 56 | strut |
| 57 | strut |
| 58 | strut |
| 59 | shroud |
| 60 | slot |
| 61 | burner element |
| 62 | grate |
| 63 | curved section |
| 64 | leg |
| 65 | leg |
| 66 | leg |
| 67 | leg |
| 68 | support surface |
| 69 | strut |
| 70 | strut |
| 71 | strut |
| 72 | strut |

The foregoing embodiments are presented by way of example only; the scope of the present invention is to be limited only by the following claims.

The invention claimed is:

1. An outdoor cooking apparatus, comprising:
a) a burner frame that includes a base having a portion that engages an underlying support surface during use, an upper grate that receives a pot during use, the upper grate having a cooking surface that enables a pot to be supported by the frame upon said cooking surface;
b) the frame including a plurality of legs that extend between the base and the grate;
c) a burner nozzle support element that is attached to the frame, the support element carrying a burner nozzle and there being a vertical clearance distance between the base and the burner nozzle support element;
d) a pot having an interior, a circular bottom, a generally cylindrically shaped sidewall, a generally circular open top surrounded by a pot rim, a diameter and a height that is greater than the said vertical clearance distance;

e) the pot being sized and shaped to fit in an upright position inside the frame for shipment or storage and defining with the frame a storage position, wherein the legs extend around the pot and the burner nozzle support element is positioned at least in part within the pot interior, below the pot rim.

2. The outdoor cooking apparatus of claim 1 wherein the frame includes a shroud that surrounds the burner nozzle, and a majority of the shroud fits inside the pot interior in the storage position.

3. The outdoor cooking apparatus of claim 1 wherein the base is a ring.

4. The outdoor cooking apparatus of claim 1 wherein the grate includes a ring.

5. The outdoor cooking apparatus of claim 4 wherein the grate includes a ring and a plurality of grate members attached to the frame next to the ring.

6. The outdoor cooking apparatus of claim 5 wherein the grate members are circumferentially spaced.

7. The outdoor cooking apparatus of claim 6 wherein the grate members are radially extending.

8. The outdoor cooking apparatus of claim 1 further comprising a lid that fits the pot open top and in the storage position, the pot lid fits inside the frame.

9. The outdoor cooking apparatus of claim 4 further comprising a lid that fits the pot open top and in the storage position, the pot lid fits inside the frame.

10. An outdoor cooking apparatus, comprising:
  a) a burner frame that includes a base having a portion that engages an underlying support surface during use, an upper grate that receives a pot during use, the upper grate having a cooking surface;
  b) the frame including a plurality of rings and a plurality of legs that span between the rings;
  c) a burner nozzle support element that is attached to the frame and that holds a nozzle and there being a vertical clearance distance between the base and the burner nozzle support element;
  d) a pot having an open top surrounded by a pot rim, an interior, a diameter and a height;
  e) the pot being sized and shaped to fit inside the frame for shipment or storage and defining with the frame a storage position, wherein the legs extend around the pot and the burner nozzle support element is positioned to extend below the pot rim and open top and into the pot interior via the open top.

11. The outdoor cooking apparatus of claim 10 wherein the frame includes a shroud that surrounds the burner nozzle, and at least a majority of the shroud fits inside the pot interior in the storage position.

12. The outdoor cooking apparatus of claim 10 wherein the base is a ring.

13. The outdoor cooking apparatus of claim 10 wherein the grate includes a ring.

14. The outdoor cooking apparatus of claim 10 wherein the grate includes a ring and a plurality of grate members attached to the ring.

15. The outdoor cooking apparatus of claim 14 wherein the grate members are circumferentially spaced.

16. The outdoor cooking apparatus of claim 15 wherein the grate members are radially extending.

17. The outdoor cooking apparatus of claim 10 further comprising a lid that fits the pot open top and in the storage position, the pot lid fits inside the frame.

18. The outdoor cooking apparatus of claim 13 further comprising a lid that fits the pot open top and in the storage position, the pot lid fits inside the frame.

19. The outdoor cooking apparatus of claim 10 wherein each ring occupies a plane and at least two of the rings are in planes that are parallel.

20. A packaged outdoor cooking apparatus, comprising:
  a) a burner frame having upper and lower end portions, the upper end portion providing a grate for cooking, the bottom end portion having one or more feet for engaging a floor, a plurality of legs that extend between the grate and the one or more feet, a burner shroud that depends from the grate and at a position spaced radially inwardly from the legs to provide a pot storage area in between the legs and the shroud;
  b) a burner nozzle support element that is supported by the frame and that holds a burner nozzle;
  c) a pot having generally cylindrical side wall, a bottom, a pot rim surrounding an open top, a diameter and a height;
  d) a shipping container having an interior that is receptive of the burner frame and pot in a storage position;
  e) the pot being sized and shaped to fit in an upright position inside the frame for shipment or storage and defining with the frame the storage position, wherein the legs extend around the pot, and wherein the burner support element and shroud are positioned at least in part below the pot rim and within the pot interior; and
  f) wherein a shipping orientation of the container, pot and frame is defined by the combination of frame and pot in the storage position placed inside the shipping container.

21. The outdoor cooking apparatus of claim 20 wherein the shroud substantially surrounds the burner nozzle, and a majority of the shroud fits inside the pot interior in the storage position.

22. The outdoor cooking apparatus of claim 20 wherein the foot or feet is a ring.

23. The outdoor cooking apparatus of claim 20 wherein the grate includes a ring.

24. The outdoor cooking apparatus of claim 20 wherein the grate includes a ring and a plurality of grate members attached to the ring.

25. The outdoor cooking apparatus of claim 24 wherein the grate members are circumferentially spaced.

26. The outdoor cooking apparatus of claim 25 wherein the grate members are radially extending.

27. The outdoor cooking apparatus of claim 20 further comprising a lid that fits the pot open top and in the storage position, the pot lid fits inside the frame.

28. The outdoor cooking apparatus of claim 23 further comprising a lid that fits the pot open top and in the storage position, the pot lid fits inside the frame.

29. The outdoor cooking apparatus of claim 20 wherein the shroud is generally cylindrically shaped.

30. The outdoor cooking apparatus of claim 20 wherein the base is one or more feet.

31. A packaged outdoor cooking apparatus, comprising:
  a) a burner frame having upper and lower end portions, the upper end portion providing a grate with a pot receptive cooking surface, the bottom end portion configured to interface with an underlying ground support;
  b) a burner nozzle;
  c) a burner nozzle support that is supported by the frame and that holds the burner nozzle;

d) a pot having a bottom, a pot rim surrounding an open top, a diameter and a height;
e) a shipping container having an interior that is receptive of the burner frame and pot in a storage position;
f) the storage position defined by: 1) the pot being sized and shaped to fit in an upright position inside the frame; 2) the legs extending around the pot; 3) and wherein the burner nozzle and burner nozzle support are positioned below the pot rim and at least in part within the pot interior, extending downwardly from the upper end portion of the frame into the pot interior via the pot open top; and
g) wherein a shipping orientation of the container, pot and frame is defined by the combination of frame and pot in the storage position placed inside the shipping container.

* * * * *